May 12, 1964  S. GOLDFARB  3,132,522
ROTARY SPEED REGULATOR
Filed Dec. 6, 1960  2 Sheets-Sheet 1

SAMUEL GOLDFARB
INVENTOR.
BY Andrew L. Bain
George B. Oujevolk
ATTORNEYS

May 12, 1964   S. GOLDFARB   3,132,522
ROTARY SPEED REGULATOR
Filed Dec. 6, 1960                    2 Sheets-Sheet 2

SAMUEL GOLDFARB
INVENTOR.

BY Andrew L. Bain
George B. Oujevolk

ATTORNEYS

United States Patent Office

3,132,522
Patented May 12, 1964

3,132,522
ROTARY SPEED REGULATOR
Samuel Goldfarb, Morristown, N.J., assignor to General Precision Inc., Little Falls, N.J., a corporation of Delaware
Filed Dec. 6, 1960, Ser. No. 74,072
4 Claims. (Cl. 74—1.5)

The present invention relates to rotary speed regulators and more particularly to rotary speed regulators which will maintain a shaft rotating at a fixed speed over very long periods of time without adjustment.

The essence of most timing mechanisms is a rotating shaft turning at a predetermined fixed speed. However, even the most accurate chronometers require adjustment from time to time. The timing mechanism in a space vehicle presents numerous problems since it is necessary to have means for regulating the speed of the timing shaft over very long periods of time during which physical adjustment cannot be made. Although attempts have been reported to solve the foregoing difficulties and other difficulties, none, as far as I am aware have ever been completely free of defects.

It has now been discovered that means can be provided to regulate the speed of a shaft which are simple and efficient, presenting few of the shortcomings heretofore encountered in this type of device.

Thus, it is an object of the present invention to provide a shaft rotary speed regulator.

A further object of the present invention is to provide such a regulator which is of simple construction.

Still another object of the present invention is to provide such a regulator which will maintain its regulation for a very long period of time in locations which are difficult to reach such as a space vehicle.

With the foregoing and other objects in view, the invention resides in the novel arrangement and combination of components and in the details of construction hereinafter described and claimed.

Generally speaking, the present invention contemplates the combination of rotating means, the rotating ends of which pass between the tyne ends of tuning fork means. One of these means is provided with a source of potential energy which is applied to the ends of said other means as said rotating ends pass said tyne ends, said applied energy being of sufficient magnitude to maintain said tynes vibrating at their natural frequency. The transferred energy may be mechanical, magnetic, or electromagnetic in nature.

The advantages of the invention will become apparent from the following description taken in conjunction with the accompanying drawing in which.

Figure 1:
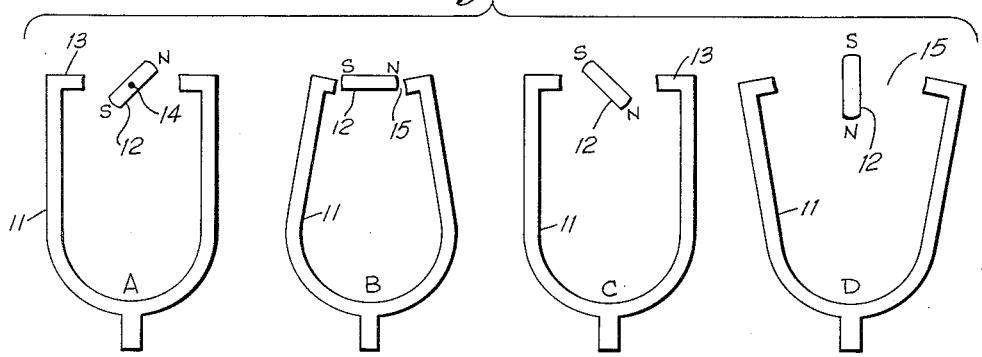
FIGURE 1 is a longitudinal view of the speed regulation means herein contemplated at four different time instants during a time interval when the rotary device being regulated is turning at the desired speed.
Figure 2:
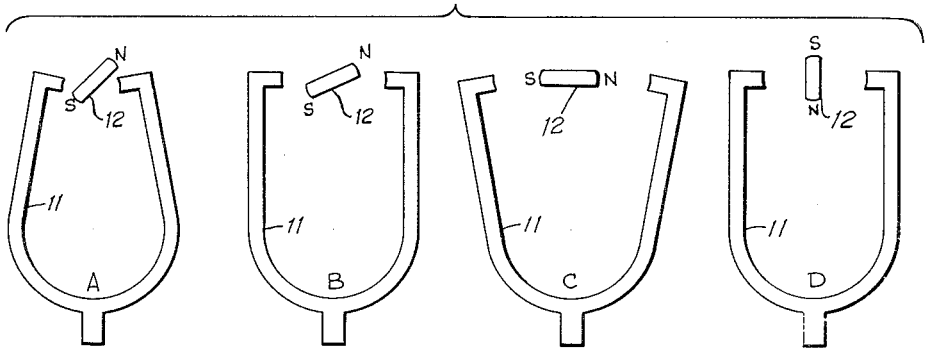
FIGURE 2 is a view similar to FIGURE 1 but during a time interval when the rotary device has not yet adjusted to the desired speed.

Shown in the drawing is a horseshoe shaped tuning fork 11 having tyne ends 13. Rotating on a shaft 14 intermediate ends 13 is a permanent magnet 12 having north and south poles N and S. In FIGURE 1, the magnet 12 is rotating at the natural frequency of fork 11. The air gap 15 between the magnet 12 and tyne ends 13 will be smallest at time B when the ends are closest together and will be largest at time D when the ends are furthest apart. At time A, as the magnet poles N and S are approaching the tyne ends, the attraction on the tyne ends 13 increases thereby accelerating rotation. The magnetic force reaches its peak at time B when the tuning fork tyne ends are closest. At time C, when the magnet poles are going away from the ends, the magnet tends to be retarded. At time D, the magnetic force on the ends is exactly equal and then the cycle starts again. If as shown in FIGURE 2, the magnet is rotating at a slower rate of speed than the resonant frequency, there is at time A, when the tyne ends are closest, a strong attraction on the tyne ends by the magnet. This speeds up the rotation of magnet 12 in time B. There is no corresponding retarding force in time C as the tyne ends are then furthest apart. The tendency to speed up rotation starts again in time D. With this tendency to speed up the magnet rotation, the magnet will soon reach the resonant speed of the tynes at which time it will lock in.

At low rotation speed, the distance between the fork tynes decreases slightly twice each revolution as the magnet poles align with the tynes. At some higher shaft speed the magnet action will occur at the resonant frequency of the fork and the amplitude of the tyne movement will increase. If the natural frequency of the fork is $f_n$ cycles per second and the number of rotor poles $p$, the synchronous speed $W_s$ is $$W_s = \frac{f_n}{p} \times 60 \text{ r.p.m.}$$

At synchronous speed a governing action will take place determined by the phase relation of the magnet and tuning fork.

The governing action may be explained as follows:

Assume that the magnet rotating at synchronous speed is phased so that the poles align with tynes when the tynes are precisely at the closest spacing of its vibrating excursion as shown in FIGURE 1. The spacing between magnet pole and tyne varies as the magnet approaches alignment in an exactly symmetrical manner as when it leaves, the magnetic attraction aiding rotation is thus balanced by equal forces retarding rotation. This action as shown in FIGURE 1 occurs during different times, i.e., during time A and time C. But, the net torque is zero.

If the magnet speed increases so that the poles reach alignment before the tynes are closest, the magnetic attraction force aiding rotation will be less because of the greater air gap. As the magnet poles pass alignment, the tynes approach closer so the air gap is less and the forces retarding motion increase. The result is a net retarding torque roughly proportional to the phase lead of the magnet. Under these conditions, energy is transferred from the rotating shaft to the vibrating fork where it is dissipated as heat.

When the magnet reduces speed so that the poles are not yet in alignment when the tynes are at the closest phase, the aiding forces are comparatively large. The tynes are further apart as the pole passes alignment and the retarding forces are less. The net aiding torque tends to accelerate the shaft and energy is transferred from the fork to the shaft.

Continued rotation in a lagging phase will cause the fork to stop vibrating. Proper action is dependent on geometry, mechanical damping losses in the fork and magnet pole strength.

Figure 3:
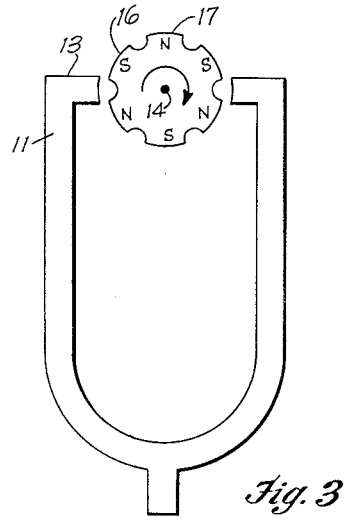
FIGURE 3 illustrates a longitudinal view of another embodiment of the invention herein contemplated.
Figure 4:
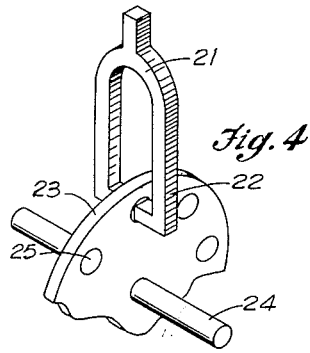
FIGURE 4 shows a perspective view of still another embodiment of the invention herein contemplated.

To achieve lower synchronous speeds, additional poles 16 and 17 may be provided using the arrangement shown in FIGURE 3. The arrangement shown in FIGURE 4 shows a tuning fork 21 with tynes 22 over a nonmagnetic disc 23 rotating on a shaft 24 having twenty-seven magnet inserts 25 equally spaced along the periphery of the disc. The disc rotates between the tynes of the fork so that magnets 25 will pass before the ends of the tynes. If the natural frequency of the fork is 100 c.p.s., the synchronous speed is $$W_s = \frac{100}{27} \times 60 = 222.2 \text{ r.p.m.}$$

Figure 5:
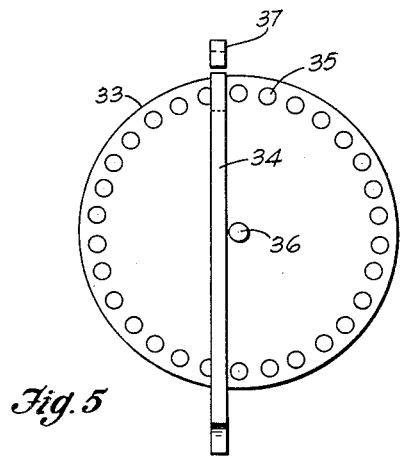
FIGURE 5 is a longitudinal perspective view of an embodiment of the invention herein contemplated similar to that of FIGURE 4.
Figure 6:
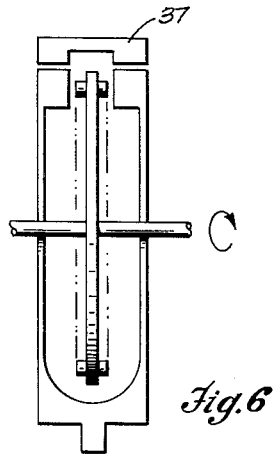
FIGURE 6 is an end view of the embodiment shown in FIGURE 5.
Figure 7:
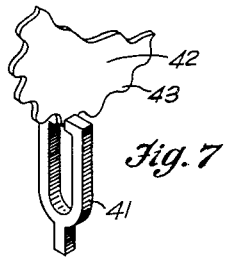
FIGURE 7 is a perspective view of an embodiment of the invention herein contemplated also operating on the principles described in FIGURE 4.

In the arrangement of FIGURE 5 and FIGURE 6, unlike in FIGURE 4, the tynes are not disposed over the disc but disc 33 rotates between the fork junction and ends of tynes 34 so that the magnet inserts 35 not only pass the ends of the tynes but also the junction of the fork. The result is the same as in FIGURE 4. Shaft center 36 is not aligned with tynes 34 and this is not necessary. In this arrangement it is preferable to complete the magnetic circuit by an external bridge 37.

If tynes 41 are magnetic, a ferromagnetic gear shaped disc 42 may be used. The spacing between the teeth 43 act as an air gap; the teeth act as poles.

In the foregoing embodiments using a tuning fork means and a rotary means, it is essential that one of said means be a magnet permanent or electro-magnet, the potential energy being magnetic, while the other of said means to which said energy is applied must be magnetic material. The device must be so designed that the magnitude of the magnetic field is powerful enough to carry out the desired operations. These embodiments have the advantage that there is no physical contact between the parts and when this feature is required or desirable, these embodiments are of course preferred.

Figure 8:
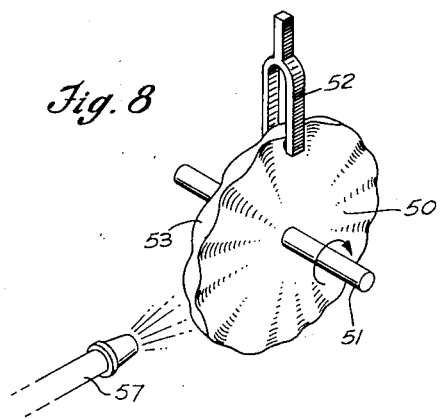
FIGURE 8 is a perspective view of yet another embodiment of the invention herein contemplated; and, FIGURE 9 is a top view of the embodiment shown in FIGURE 8.
Figure 9:

In certain space vehicles or other machines, magnetic energy is not desired and in certain applications even metal parts are not wanted. In such cases it is possible to duplicate the action depicted in FIGURE 1 by mechanical interaction of the tynes and the rotary means. In FIGURES 8 and 9 there is shown a disc 50 on a driven shaft 51 whose speed is regulated by fork 52. The ridges 53 vary the disc thickness of the periphery preferably sinusoidally so that there are broad portions 54 representing the peak of the sinusoidal wave and narrow portions 55 representing the minimum wave point. At the ends of tynes 52 are tips 56 preferably arcuate in shape. When the periphery of disc 50 is rotated between tips 56, the mechanical interaction of the tuning fork and disc will cause synchronous lock in at speed $W_s$ when $$W_s = \frac{f_n}{p} \text{ r.p.s.}$$

where $f_n$ is the natural frequency of the fork in c.p.s., and
$p$ is the number of ridges on the disc In the embodiment depicted, it is preferable that the distance between tyne tips 56 should be a fraction smaller than the distance across width peak 54. This embodiment is particularly effective when there is a loose driving force rotating the wheel such as an air jet 57.

It is to be observed therefore that the present invention contemplates a rotary speed regulator utilizing rotating means such as a bar magnet 12 or a disc 23, 33, 42 and 50; acting in combination with tuning fork means 11, 16, 21, 34, 41, and 52. One of these means may in part be a permanent or electro magnet having a potential magnetic energy stored therein such as poles 16, 17, magnet inserts along a disc periphery 25, 35 or the tynes 41, in which case the other means must have magnetic material associated therewith to have applied thereto the potential energy of the magnet. Or, the mechanical interaction of ridges 53 around the periphery of a disc against the fork tyne tips 56 can be used. The speed of rotation of the rotary means $W_s$ is equal to:

$$W_s = \frac{f_n}{p} \text{ r.p.s.}$$

where $f_n$ is the natural frequency of the fork and $p$ the number of poles or ridges.

Furthermore, it is to be observed that as used herein the terms "potential energy" means mechanical, magnetic or electro-magnetic energy.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and appended claims.

I claim:
1. A rotary speed regulator comprising in combination, rotating means including rotating ends; tuning fork means including tyne ends, said rotating ends passing between said tyne ends; and a source of potential energy in either said rotating ends or said tyne ends, the others of said rotating or tyne ends being constructed and adapted to have said potential energy applied thereto, said rotating means being a bar magnet, said tuning fork means being made of magnetic material.

2. A rotary speed regulator comprising in combination, rotating means including rotating ends; tuning fork means including tyne ends, said rotating ends passing between said tyne ends; and a source of potential energy in either said rotating ends or said tyne ends, the others of said rotating or tyne ends being constructed and adapted to have said potential energy applied thereto, said rotating means being a nonmagnetic disc having a plurality of magnet inserts equally spaced along the periphery of the disc, said tuning fork being made of magnetic material.

3. A device as claimed in claim 2, said rotating means being a nonmagnetic disc with said magnet inserts rotating between the fork junction and the tyne ends, and, an external bridge between the tyne ends to complete the magnetic circuit.

4. A rotary speed regulator comprising in combination, rotating means including rotating ends; tuning fork means including tyne ends, said rotating ends passing between said tyne ends; and a source of potential energy in either said rotating ends or said tyne ends, the others of said rotating or tyne ends being constructed and adapted to have said potential energy applied thereto, said rotating means being a disc having a plurality of ridges around the periphery thereof, said ridges varying the thickness of the disc periphery sinusoidally so that there are broad portions representing the peak of the sinusoidal wave and narrow portions representing the minimum wave point, said tyne ends having tips, arcuate in shape adapted to be engaged by said ridges, whereby the mechanical interaction of the tuning fork and disc will regulate the rotation of said disc so that it rotates at a speed of $W_s$ when $$W_s = \frac{f_n}{p} \text{ r.p.s.}$$

where $f_n$ is the natural frequency of the fork in c.p.s. and $p$ is the number of ridges on the disc.

References Cited in the file of this patent

UNITED STATES PATENTS

| | | |
|---|---|---|
| 1,972,971 | Barenyi | Sept. 11, 1934 |
| 1,975,308 | Ashdown | Oct. 2, 1934 |
| 2,616,298 | Clifford | Nov. 4, 1952 |
| 2,743,614 | Clifford | May 1, 1956 |
| 2,960,817 | Hetzel | Nov. 22, 1960 |